United States Patent [19]

Victor et al.

[11] Patent Number: 4,751,380
[45] Date of Patent: Jun. 14, 1988

[54] DETECTOR SYSTEM FOR OPTICAL MOUSE

[75] Inventors: Kenneth E. Victor, Mountain View; Carl A. Goy, Fremont, both of Calif.

[73] Assignee: MSC Technologies, Inc., Santa Clara, Calif.

[21] Appl. No.: 935,350

[22] Filed: Nov. 25, 1986

[51] Int. Cl.⁴ .......................... G09G 3/02; H01J 40/14
[52] U.S. Cl. ..................................... 250/221; 340/710
[58] Field of Search .............. 250/221, 237 G, 237 R; 340/710; 235/472; 358/293, 294

[56] References Cited

U.S. PATENT DOCUMENTS

| 4,364,035 | 12/1982 | Kirsch | 340/710 |
| 4,390,873 | 6/1983 | Kirsch | 340/710 |
| 4,409,479 | 10/1983 | Sprague et al. | 250/237 |
| 4,521,772 | 1/1985 | Lyon | 235/472 |
| 4,546,347 | 10/1985 | Kirsch | 340/710 |

Primary Examiner—David C. Nelms
Assistant Examiner—Michael Messinger

[57] ABSTRACT

A cursor position control system in which an optical mouse having a light source and three-by-three detector array moves over a surface having a grid pattern or intersecting orthogonal grid lines of a first color and spaces defined between the grid lines of a second contrasting color. The grid lines are characterized by a line width. Detector cells are grouped into pairs of cells for detecting motion in a particular direction. Cells in a pair are separated so as to image areas an odd multiple of line widths apart in a direction orthogonal to that particular direction. Pairs of cells image areas separated in the particular direction from areas imaged by related pairs of cells by an odd multiple of half line widths. Pairs of electrical signals from pairs of cells are combined then differentiated with respect to time to produce related quadrature signals indicative of the amount and direction of movement of the mouse relative to the surface.

14 Claims, 3 Drawing Sheets

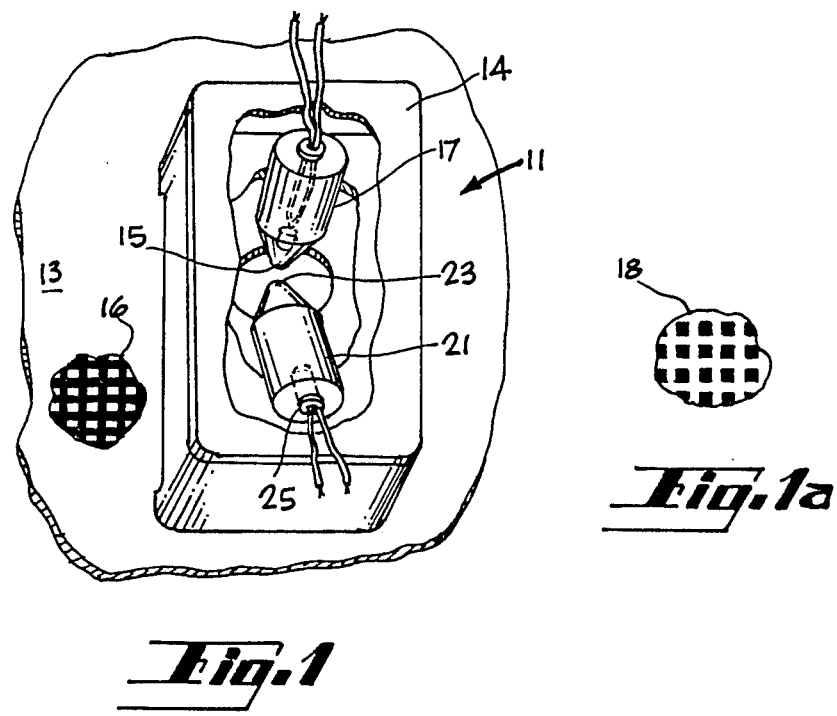
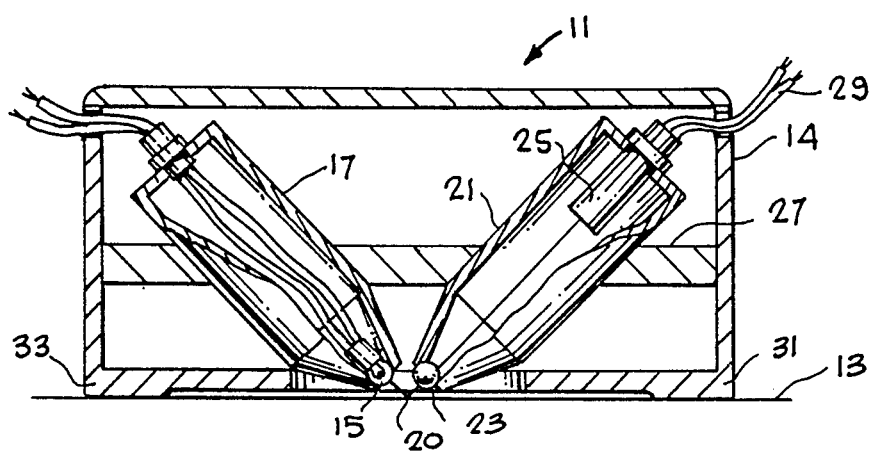

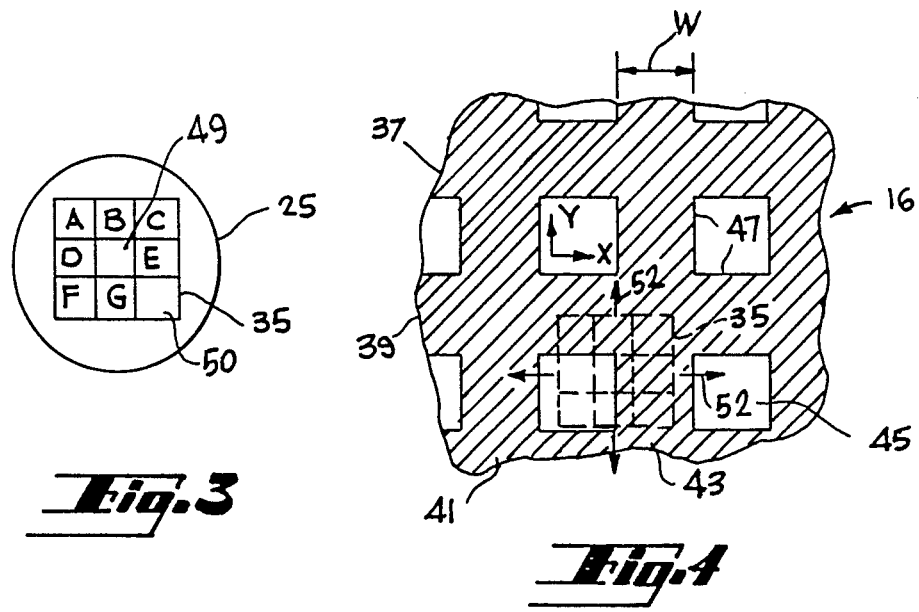
Fig. 3
Fig. 4
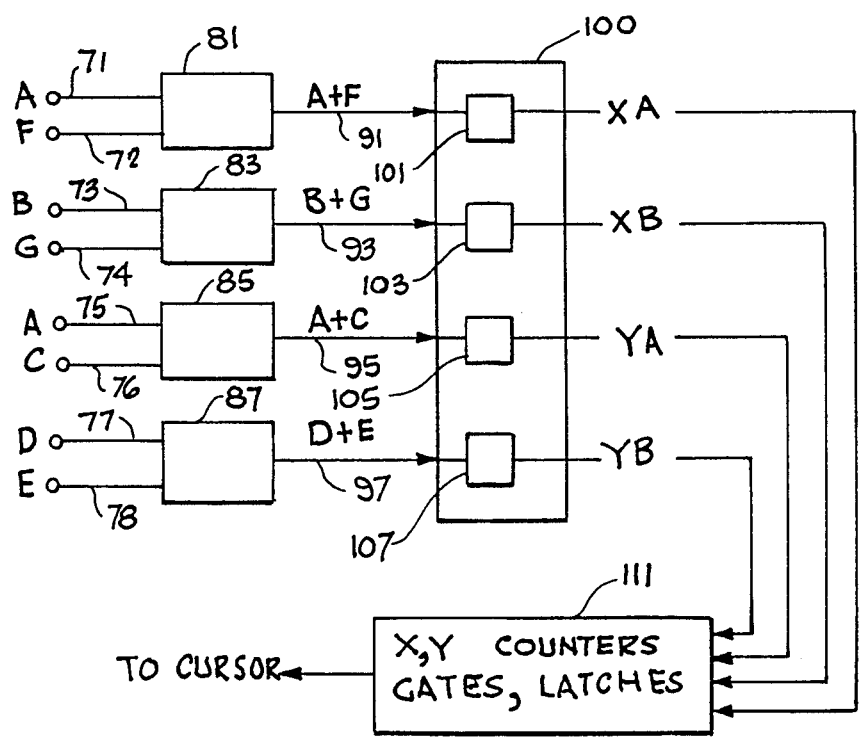
Fig. 5

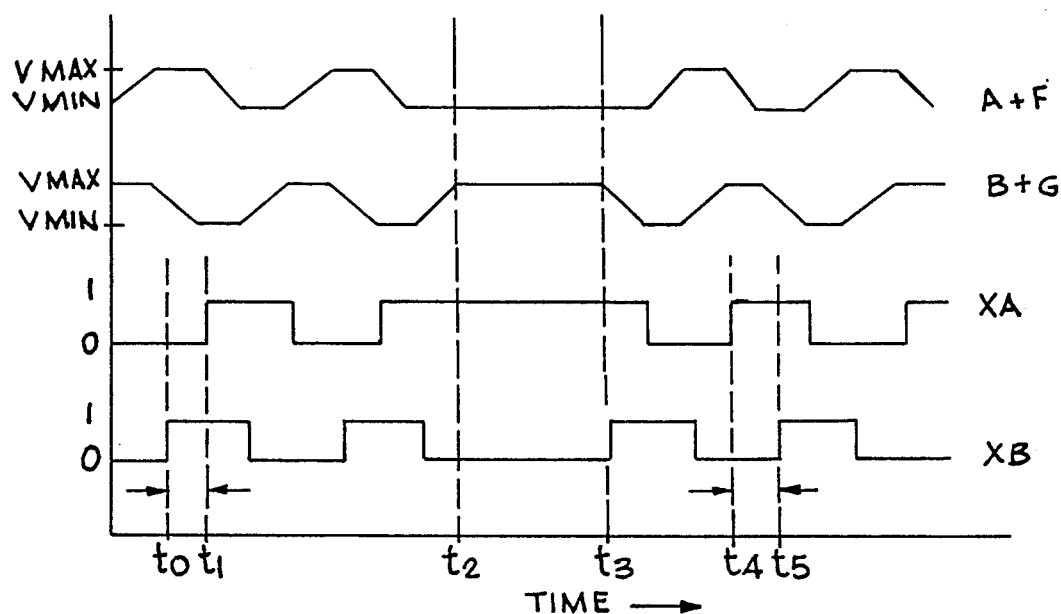
_Fig. 6_
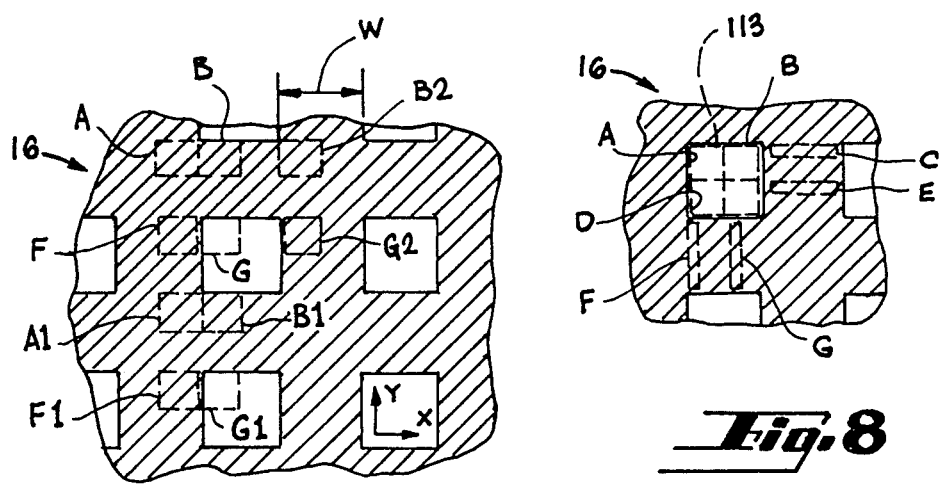
_Fig. 7_          _Fig. 8_

DETECTOR SYSTEM FOR OPTICAL MOUSE

TECHNICAL FIELD

The present invention relates to an optical mouse or cursor position control device in which movement of the device over a passive grid surface controls movement of a cursor on a visual display system, such as a computer screen. In particular, the invention relates to optical detector systems of such a mouse for interpreting the position of the mouse with respect to the grid.

BACKGROUND ART

In U.S. Pat. No. 4,409,479, Sprague et al. describe an optical mouse which moves over a grid of horizontal and vertical lines of one color with spaces between the grid lines of another color. The mouse generates four quadrature signals indicative of the amount and direction of movement of the mouse. The signals are generated by four sensors, two sensors in each of the horizontal and vertical directions. The sensors have a radiation collection area with a width which is not more than one-half of a grid period and a length which is at least as great as the grid period. The two sensors used in each direction are separated by one-quarter of the grid period, and each pair of sensors generates a pair of related quadrature signals. The phase relationship of the signal pairs indicates the direction of movement of the mouse.

In U.S. Pat. No. 4,546,347, Kirsch describes an electro-optical mouse having two linear arrays of detector cells at right angles to each other. The mouse moves over a surface marked with a grid of lines with three optical contrast levels, including a separate contrast level for line intersections. One linear array images a line and a space in the horizontal direction, while the other array images a line and space in the vertical direction. Each array has four cells, adjacent cells being 90° out-of-phase with each other. By pairing first and third cells and second and fourth cells of each array, then subtracting the output of these, line crossings may be observed with improved ability without the need for a compensating threshold voltage.

In U.S. Pat. No. 4,364,035, Kirsch describes an electro-optical mouse which moves over a surface marked with a two color grid of lines. The mouse has a dual color light source which rapidly and continuously switches from one color to the other. The mouse also has a four-quadrant light detector positioned for receiving the light reflected from the grid. During illumination by light of one color the detector can distinguish lines only of the opposite color. Hence, as the mouse crosses lines of different color, the detectors sense changes in contrast and generates electrical signals representing the line crossings. The desired output from the detectors is taken from three of the four cells, two horizontal bits from two horizontal cells and two vertical bits from two vertical cells. By clocking emission of the two colors and the detector output signal, a position signal for a cursor may be derived.

In cursor position control systems using an optical mouse moving over a grid, it is desirable that the mouse components be sufficiently compact so that the mouse fits in the palm of a hand. The system should be able to reliably determine motion of a mouse over a grid surface for every possible relative position between the detector elements and the grid lines. Further, it is desirable that the system not be strongly dependent on the absolute reflectivity of the particular grid or on the amount of contrast between reflective and non-reflective portions of the grid, so that compensation with a threshold voltage is not required. Accordingly, it is an object of the present invention to produce a cursor position control system which meets these criteria.

DISCLOSURE OF THE INVENTION

The above object has been met with a cursor position control system in which an optical mouse movable over a grid surface has a detector which is a three-by-three array of detector cells. The surface has a grid pattern thereon which is made up of two intersecting orthogonal sets of parallel grid lines and spaces defined between the grid lines. The grid lines are of a first color and the spaces are of a second contrasting color. The grid lines are uniformly spaced apart and of a uniform line width. The spaces have a width which is equal to the line width. The mouse has a light source which illuminates a portion of the surface and the detector is disposed to receive and detect the light reflected from the surface.

The detector cells image areas of the grid pattern which typically have a characteristic dimension which is substantially equal to one-half of the line width. Seven of the nine detector cells are used. The cells are grouped into pairs of cells which are located so as to image areas on the grid pattern a distance of an odd multiple of line widths apart in a direction which is orthogonal to the direction of motion which they detect. Thus, for example, a pair of cells for detecting vertical motion may be located for imaging areas one line width horizontally apart, thereby ensuring that one of the cells in the pair detects crossings of the mouse through spaces and horizontal grid lines. Alternatively, a pair of cells for detecting vertical motion may be located for imaging areas on the grid which are spaced three, five, seven or some other odd number of line widths horizontally apart. Similarly, pairs of cells for detecting horizontal motion may be located for imaging areas one, three or other odd number of line widths vertically apart. There are two pairs of cells for detecting horizontal motion and two pairs of cells for detecting vertical motion. One pair of cells for detecting a particular direction of motion image areas that are located one-half line width, three-halves line widths or other odd multiple of half line widths apart in that direction of motion from the areas imaged by other related pair of cells, thereby producing a distinguishable lead or lag in the detection by the pairs of cells of crossings over spaces and grid lines.

The detector cells produce an electrical output signal corresponding to the amount of light they receive. The signals from each of the four pairs of cells are combined and then converted to four quadrature signals of square waves. The quadrature signals switch to a first state when the combined signals are increasing with time and switch to the opposite state when the combined signals are decreasing with time, or vice versa, thereby avoiding threshold problems and the need for a reference voltage.

BRIEF DESCRIPTION OF THE DRAWINGS

FIG. 1 is a perspective plan view of an optical mouse having a detector in accord with the present invention.

FIG. 1a is a plan view of an alternate grid pattern for use with the optical mouse of FIG. 1.

FIG. 2 is a side view of the apparatus shown in FIG. 1.

FIG. 3 is a plan view of the detector array for use in the optical mouse of FIGS. 1 and 2.

FIG. 4 is a plan view of a portion of a grid pattern for use with the optical mouse of FIG. 1 and indicating the relative size of the area observed by the detector array of FIG. 3 in relation to the grid pattern.

FIG. 5 is a schematic electrical diagram of a logic circuit used with the detector in FIG. 3.

FIG. 6 is a timing diagram representation of quadrature signal outputs of two pairs of detector cells of FIG. 3, indicative of the amount and direction of movement along a particular orthogonal coordinate axis.

FIG. 7 is a plan view of a portion of a grid pattern for use with the optical mouse of FIGS. 1 and 2 illustrating the relative spacing of detector cells in relation to the grid pattern.

FIG. 8 is a plan view of a portion of a grid pattern indicating the relative sizes of areas observed by detector cells of an alternate detector in relation to the grid pattern. BEST MODE OF CARRYING OUT THE INVENTION With reference to FIGS. 1 and 2, an optical mouse 11 includes a housing 14, containing a light source 15 and a photodetector 25. The housing is gripped by a human hand and pushed in any direction on a surface 13, corresponding to the direction and extent to which it is desired to move a cursor or similar device on a visual display system, such as a computer screen. Housing 14 fits in the palm of a hand and has thin, low friction feet or spacers 31 and 33 which contact surface 13 and elevate the body of the housing a slight distance above surface 13. Spacers 31 and 33 may be made, for example, of Teflon or nylon so that the housing slides easily over the surface.

Source 15 may be a light emitting diode (LED), incandescent bulb or other broadband illumination source and may emit ultraviolet and infrared as well as visible light. Alternatively, source 15 may be a laser such as a diode laser. Source 15 is aimed downwardly at a spot 20 on surface 13. Source 15 may be mounted within a light tight supporting tube 17, as shown, or may be directly aimed at the surface. Supporting tube 17 extends angularly downward through a planar support 27 of housing 14 and is held in place therein. Preferably, source 15 is mounted close to the surface so that light arriving at the surface will be in a relatively narrow spot, with a diameter sufficient to illuminate the area viewed by detector 25. Typically, as for example with the detector in FIG. 3, the spot diameter is about 1.0 mm, sufficient to cover a grid line and space with a line width of about 0.5 mm.

Also mounted in housing 14 is a detector tube 21 having at its forward end an imaging lens 23. The remainder of the tube 21 is generally light tight. Tube 21 extends angularly downward through shelf 27 so as to receive light reflected from spot 20. Lens 23 directs light reflected from spot 20 onto detector 25. Detector 25 is mounted at the rear of tube 21 and receives a magnified image of a portion of surface 13 via the imaging lens 23. Typically, lens 23 is spaced more than one focal length from the surface. The spacing between detector 25 and lens 23 is about five focal lengths. The magnification that results should be such that the area being looked at by detector 25 images onto the detector. As low a magnification as possible is preferred so as to reduce optical errors. The diameter of lens 23 is approximately 3 to 8 mm, but could be more or less. If the light source 15 is sufficiently close to the surface, or is a laser, so that detector 25 does not detect light directly from source 15, tube 21 becomes unnecessary and may be omitted.

In FIG. 1, a partial grid pattern 16 may be seen on surface 13, with dark orthogonal lines and white spaces between lines. Surface 13 has a horizontal and vertical repetitive pattern of passive, position related indicia which extends over at least a portion of the surface. Preferably, these indicia are marks of high optical contrast, such as an optically absorptive and reflective pattern. Such a pattern could be a shiny metallic, white or other highly reflective surface with a grid of black lines marked on the surface. The lines are printed with ink having pigment particles with the desired optical property. Alternatively, black squares may be marked on the surface, resulting in the pattern 18 seen in FIG. 1a having reflective grid lines with low reflectivity spaces therebetween. The grid pattern is discussed further below in greater detail with reference to FIG. 4.

The cursor position control system of the present invention, which comprises optical mouse 11 and surface 13 with grid pattern 16, generates electrical signals which instruct a cursor regarding movement up or down, left or right. There is no particular starting place for the mouse on the surface and it may be brought down any place on the surface, so long as there is sufficient room to move the mouse in a direction wherein cursor motion is desired. When placing the mouse on the surface, alignment should be such that detector 25 is appropriately oriented with respect to the grid pattern on the surface, as shown in FIG. 4. However, the mouse may be rotated up to 45 degrees in either direction from this nominal orientation without affecting the decoded signal. The typical size for housing 14 of mouse 11 is approximately 6 cm in width and approximately 8 cm in length. A preferred size for the surface would be approximately 22 cm in width and approximately 30 cm in length. These dimensions are not critical and the housing or surface may be larger or smaller as needed.

In FIG. 3, the active area of detector 25 is represented by the square 35. Detector 25 is a three-by-three array of detector cells. The cells may be transistors or diodes of a CCD areawise array. Seven of the nine detector cells, designated by the letters A, B, C, D, E, F and G, are active while the two remaining cells 49 and 50 are unused. Cells A, B, F and G are used for determining horizontal motion and cells A, C, D and E are used for determining vertical motion. The manner in which this determination is made is discussed below with reference to FIGS. 5 and 6.

FIG. 4 shows a portion of the grid pattern 16 on surface 13. Grid pattern 16 is made up of two intersecting orthogonal sets of grid lines, including a set of horizontal grid lines, such as lines 37 and 39, and a set of vertical grid lines, such as lines 41 and 43, and is also made up of spaces 45 defined between the grid lines. Grid lines are of a first color, while spaces are of a second color contrasting with a first color. Thus, grid lines may be reflective or white and spaces may be absorptive or black, or vice versa. The boundaries 47 between grid lines and spaces need not be sharply defined, although this is preferred, provided a sufficient contrast ratio exists between lines and spaces so as to be detectable. In producing the grid pattern, the entire surface 13 may start as a reflective area. Glossy white paper or mylar may be used. Colored inks or dyes may then be used to print the lines.

Typically the vertical grid lines 41 and 43 and the horizontal grid lines 37 and 39 have approximately the same line width W. Each set of grid lines is made up of parallel uniformly spaced grid lines. The spaces 45 are of uniform size with a width approximately equal to the line width. Typically, the line width W is about 0.5 mm for both vertical and horizontal grid lines, forming square spaces 0.5 mm on a side. 1.0 mm or other line widths may also be used. The pattern need not form square spaces, although this is easy to handle for computation purposes.

In FIG. 4, the dashed line 35 indicates the relative area within a grid which forms the field of view and orientation of the array detector 25 illustrated in FIG. 3, relative to the grid of lines and in particular to the line width. The dashed line 35 represents the area imaged by the lens of the detector tube onto the detector array, such that each detector cell is capable of resolving one-half the width of a grid line or space.

The optical mouse is moved in any direction relative to grid pattern 16. This is represented in FIG. 4 by arrows 52 in which the field of view of the detector within dashed square 35 may move up or down and left or right. Since the grid lines are orthogonal, as indicated in FIG. 4 by the x-y coordinate axes, horizontal motion in this X-direction and vertical in the Y-direction are detected and measured independently. If the mouse is rotated more than 45 degrees, the axes switch (i.e., the horizontal cells sense vertical motion, and vice versa).

For horizontal motion, detector cells A and F are located so as to image areas which are one line width vertically apart. This ensures that while one cell follows a horizontal grid line, such as line 39, the other cell is away from a horizontal grid line and detects crossings through vertical grid lines and spaces. Likewise, detector cells B and G are located so as to image areas which are one line width vertically apart. The pair of cells A and F is located so as to image areas one-half of a line width horizontally apart from areas imaged by a related pair of cells B and G. This separation produces a lead or lag in the detection of line crossings by one pair relative to the other related pair so that direction of motion may be determined.

For vertical motion, detector cells A and C are located so as to image areas one line width horizontally apart. Detector cells D and E are also located so as to image areas one line width horizontally apart. The pair of cells A and C is located so as to image areas one-half of a line width vertically apart from areas imaged by the pair of cells D and E. The result is that for each pair, while one cell follows a vertical grid line, the other cell of the pair detects crossings through horizontal grid lines and spaces. One pair leads the other related pair in the detection of line crossings relative to the other pair.

In FIG. 4, detector cells of a pair of cells for detecting motion of the mouse in a particular direction image areas of the grid pattern which are separated in a direction orthogonal to that particular direction by a distance of one line width W, thereby ensuring that one cell in the pair detects crossings through grid lines and spaces. However, as seen in FIG. 7, there are also other cell separations which obtain this result. A pair of detector cells A and F are located so as to detect horizontal motion, and, as in FIG. 4, image areas one line width apart. Cells A and A1 image areas two line widths apart. During horizontal motion, cells A and A1 either both detect crossings through vertical grid lines and spaces or both follow horizontal grid lines. In the later case, neither cell A nor cell A1 detects horizontal motion. Accordingly, cells A and A1 and other pairs of cells which image areas separated by an even number line widths W are not suited for detecting mouse movement. Cells A and F1 image areas which are three line widths apart. As with cells A and F, one cell in the pair A and F1 is always located for detecting crossings through grid lines and spaces. This is also true for any cell pairs which image areas separated by other odd multiples of line widths W. In FIG. 7, pairs of cells B and G, B and G1, and B2 and G2 also image areas an odd number of vertical line widths apart, and can detect horizontal mouse motion over the grid. The case for vertical motion detection is analogous.

Also in FIG. 4, each pair of cells for detecting motion of the mouse in a particular direction image areas of the grid pattern which are separated in that particular direction from areas imaged by a related pair for detecting motion in the same direction by onehalf of a line width, thereby producing a recognizable lead or lag in the detection of line crossings by one pair relative to the other related pair. However, as seen in FIG. 7, there are also other pair separations which obtain this lead or lag. Pair of cells A and F image areas one-half line width apart from pairs of cells B and G. During rightward motion of the mouse, pair B and G leads pair A and F by a 90° phase separation in the detection of line crossings. During leftward motion, pair B and G lags pair A and F by 90°. Accordingly, there is a recognizable difference between leftward and rightward motion, enabling the detector system to determine the direction of motion of the mouse. Pair of cells A and F image areas three-halves line widths apart from pair of cells B2 and G2. During rightward motion of the mouse, pair B2 and G2 lags pair A and F by a 90° phase shift in the detection of line crossings. During leftward motion, pair B2 and G2 leads pair A and F by 90°. Accordingly, pairs of cells that image areas separated by three-halves of a line width produce a recognizable lead or lag that enables leftward or rightward motion of a mouse to be determined. Pairs of cells for detecting motion in a particular direction which image areas separated in that particular direction by other odd multiples of half line widths also produce this lead or lag.

Detector cells in the detector array 35 seen in FIG. 3 are substantially square and image square areas on the grid pattern in FIG. 4 which are approximately onehalf of a line width on a side. However, compared to the separations between detector cells, the size and shape of detector cells are not particularly critical. An alternate detector 113, seen in FIG. 8, illustrates this point by way of example. Detector cells A, B, F and G detect horizontal motion of a mouse, the same as in FIG. 4. Cells F and G, however, illustrate that detector cells can have any shape in which a width in the particular direction that the cells detect is at most one-half of a line width and in which a length orthogonal to the particular direction that the cells detect is in a range from one-half of a line width to one line width. Detector cell F, for example, has a narrow width, measured in the horizontal direction, of about one-quarter of a line width and a length, measured in the vertical direction, of about one line width. Detector cells A, C, D and E detect vertical motion of a mouse. The length and width of cells C and E are analogous to that of cells F and G. Cell A for detecting both vertical and horizontal motion is constrained by the limit set forth above to be substantially a square with one-half line width sides.

With reference to FIG. 5, optical signals representing differences in reflectivity are picked up by the detector cells and converted into corresponding electrical voltage signals. The electrical outputs from the detector cells are labeled A, B, C, D, E, F and G matching the corresponding cells in FIG. 3 from which they originate, and are transmitted along corresponding lines to circuits where electrical voltage addition or subtraction occurs. For example, cells A and F transmit electrical signals along lines 71 and 72 to adding or subtracting circuit 81. Cells B and G transmit electrical signals along lines 73 and 74 to adding or subtracting circuit 83. Cells A and C transmit electrical signals along lines 75 and 76 to adding or subtracting circuit 85. Cells D and E transmit electrical signals along lines 77 and 78 to adding or subtracting circuit 87. These circuits generate combined output signals along output lines 91, 93, 95 and 97 which represent the sums, denoted by A+F, B+G, A+C and D+E, or differences of each circuit's corresponding input signal.

A differentiating circuit 100 has individual differentiators 101, 103, 105 and 107 connected to respective lines 91, 93, 95 and 97. The output of a differentiator is set to a value of one wherever the voltage of the combined electrical signal A+F, B+G, A+C or D+E being input into the differentiator is decreasing with time, i.e. has a negative time derivative. The output is reset to a value of zero wherever the voltage of the combined electrical signal being input is increasing with time, i.e. has a positive time derivative. The output value remains unchanged when there is no increase or decrease, i.e. whenever the combined signal has a zero time derivative. A constant voltage for hysteresis may be included in the combined signal to prevent random switching of output signal in the case when the combined signal being input has a zero or near zero time derivative. Thus, the differentiating circuit 100 converts the combined electrical signals A+F, B+G, A+C and D+C being input from analog signals approximating sine waves to digital square wave signals. Differentiating circuits eliminate the need for a threshold voltage to compensate for the absolute reflectivities of the grid pattern, since it is the change in reflectivity which is represented by the resulting quadrature signal.

The digital square wave signals output by the differentiating circuit 100 are quadrature signals designated XA, XB, YA and YB indicative of line crossings. The quadrature signals are transmitted to the counters 111 which are commercially available and are exemplified by a computer manufactured by LISP Machine, Inc. of Cambridge, Massachusetts, or computers manufactured by Xerox Corporation and BBN of Cambridge, from many mechanical mice and the present code is identical to that produced by such mice. The output from the counter 111 is then fed to a cursor which is displayed on a video display or video terminal.

In FIG. 6, combined signal A+F varies with time in voltage between a minimum voltage Vmin and a maximum voltage Vmax as a mouse moves over a surface with the grid pattern in FIG. 4. The actual values of Vmin and Vmax depend on the absolute reflectivities of the lines and spaces, but are not critical since the detector system relies on the change in these voltage values rather than their actual values to determine the amount and direction of mouse movement. Combined signal B+G is similarly varied. In the present embodiment, the signal A+F is at a maximum voltage whenever both detectors A and F, seen in FIG. 3, are in position to receive reflected light from a grid line, and is at a minimum voltage whenever one of the two detectors is in position to receive light from a low reflectivity space. The signal will be between the maximum and minimum voltage while one of the detectors crosses over a boundary between space and grid line. If, on the other hand, the grid lines have low reflectivity and the spaces have high reflectivity the role of the maximum and minimum voltages will be reversed as will the zero and one states for signals XA and XB. However, the interpretation of signals XA and XB will be unaffected since the order in which signals XA and XB switch states at a line crossing will remain unchanged.

Quadrature signal XA corresponds to combined signal A+F and assumes a one state whenever combined signal A+F is decreasing in voltage with time, i.e. whenever the mouse moves horizontally from a grid line to a space, and assumes a zero state whenever the combined signal is increasing in voltage with time, i.e. whenever the mouse moves horizontally from a space to a grid line. Likewise quadrature signal XB corresponds to combined signal B+G. Quadrature signal YA corresponds to combined signal A+C. Quadrature signal YB corresponds to combined signal D+E.

In FIG. 6, the mouse is moving to the right, as far as its horizontal motion is concerned, up until time t2. The mouse has no horizontal motion between time t2 and time t3. The mouse has a leftward horizontal motion after time t3. Since the pair of detector cells A and F, seen in FIG. 3, image areas located one-half of a line width horizontally from the areas imaged by related pair of detector cells B and G, the combined signals A+F and B+G and consequently the corresponding quadrature signals XA and XB do not switch states simultaneously. At time t0, prior to time t2 signal XB switches to a one state. At a later time t1 also prior to time t2, signal XA switches to the one state. Thus, the signal XB leads the signal XA, thereby indicating rightward horizontal motion of the mouse relative to the surface. At time t4 after time t3, signal XA switches to the one state. At later time t5, signal XB switched to the one state. Thus, signal XB lags the signal XA, thereby indicating leftward horizontal motion of the mouse. Just prior to time t2, signal XB switches to a zero state. At time t3 signal XB switches back to a one state without any intervening switch in signal XA.

FIG. 6 was described in terms of quadrature signals XA and XB and left and right horizontal motions. It will be easily recognized that quadrature signals YA and YB are interpreted in a similar manner to determine up and down vertical motions. Further, it will be recognized that where pairs of detectors are separated from related pairs by three-halves of a line width instead of one-half line width or in other situations the motion convention may be reversed. That is, signal XB leading signal XA will indicate leftward horizontal motion of the mouse, and signal XB lagging signal XA will indicate rightward horizontal motion. Similarly, the vertical motion convention may be reversed.

The present invention provides a compact optical mouse due to the use of a three-by-three detector array. Since one detector cell in each pair of cells crosses grid lines during motion of the mouse over the grid, the system reliably determines relative motion between the mouse and the grid regardless of their relative positions. Further, because the quadrature signals derived by the system are based on differentiation with respect to time of the combined detector signals instead of the values of the detector signals themselves, the system is more strongly independent of the actual reflectivity of the grid lines and space than prior systems.

We claim:

1. An optical position control system comprising, a surface having an illuminated grid pattern thereon with two intersecting orthogonal sets of grid lines, said grid lines being of a first color and defining spaces therebetween of a second contrasting color, said grid lines characterized by a line width, an optical mouse movable over said surface, said mouse having a three-by-three detector array of detector cells disposed for imaging areas of said illuminated portion of said grid pattern, at least some of said cells being grouped into pairs of cells, each of said pairs detecting motion of said mouse in a particular first direction relative to said surface, each of said cells generating an electrical signal corresponding to light reflected from said illuminated portion of said grid pattern, said pairs of cells grouped with a first pair of cells detecting motion in said first direction by imaging areas which are separated by a distance of an odd multiple of said line width, and with a second pair of cells parallel to the first pair of cells and spaced apart in said first direction by the same amount as said first part of cells but imaging areas in a second direction, perpendicular to the first direction, said areas being spaced by a distance of an odd multiple of half line widths, and means communicating with said electrical signal from each of said cells for determining an amount and direction of movement of said mouse relative to said surface.

2. The system of claim 1 wherein said means for determining an amount and direction of movement comprises, means communicating with said cells for comprising pairs of electrical signals from said pairs of cells, means communicating with said combining means for differentiating said combined signals with respect to time producing corresponding quardrature signals, each of said quadrature signals being in a first state when said corresponding combined signal has a positive time derivative, each of said quadrature signals being in a second state when said corresponding combined signal has a negative time derivative, each of said quadrature signals being maintained in a current state when said corresponding combined signal has a substantially zero time derivative, and means for determining a lead in each of said quadrature signals relative to a related quadrature signal.

3. The apparatus of claim 1 wherein said three-by-three array of cells is laid out in the following pattern:

| A | B | C |
| D | X | E |
| F | G | X | where cells A-G are active and cells X are inactive.

4. The apparatus of claim 3 wherein output signals from said array are logically combined as follows: A+F; B+G; A+C; D+E, respectively yielding quadrature signals XA, XB, YA and YB.

5. The system of claim 1 wherein said grid lines are highly reflective and spaces are highly absorptive.

6. The system of claim 1 wherein said grid lines are highly absorptive and spaces are highly reflective.

7. The system of claim 1 wherein each orthogonal set of grid lines is uniformly spaced one line width apart.

8. The system of claim 1 wherein said spaces have a characteristic dimension which is substantially equal to said line width.

9. The system of claim 1 wherein seven of said cells are grouped into pairs of cells, one of said seven cells being common to two of said pairs.

10. The system of claim 1 wherein each of said detector cells in a pair of detector cells for detecting motion of said mouse in a particular direction images an area on said surface with a width in said particular direction of at most one-half of a line width and with a length orthogonal to said particular direction in a range from one-half of a line width to one line width.

11. An optical position control system comprising, a surface with a grid pattern thereon, said grid pattern being made up of two intersecting orthogonal sets of uniformly spaced apart parallel grid lines of a first color and spaces defined between said grid lines, said spaces being of a second color contrasting with said first color, said grid lines and said spaces being of uniform and equal width, an optical mouse movable over said surface, said mouse having (a) light source means for illuminating a portion of said grid pattern and (b) detector means, disposed in said mouse to receive and detect light reflected from said grid pattern, for generating an electrical output signal indicative of the amount and direction of movement of said mouse relative to said surface, wherein said detector means includes a three-by-three array of detector cells, each of said detector cells imaging areas of said grid pattern, said cells being grouped into pairs of cells for determining motion in one of two particular directions which are mutually perpendicular, cells in each of said pairs capable of imaging areas separated by a distance of an odd multiple of line widths in a first direction, each pair determining motion in a second direction by imaging areas separated an odd multiple of half line widths in said second direction, means for combining electrical output signals from pairs of cells, combined signals being output from said combining means, means for differentiating said combined signals with respect to time, quadrature signals corresponding to said combined signals being output from said differentiating means having a zero state and a one state, said quadrature signals being in a first state when said corresponding combined signal has a positive time derivative and being in an opposite state when said corresponding combined signal has a negative time derivative, and means for determining an amount and direction of movement from said quadrature signals.

12. The apparatus of claim 11 wherein said three-by-three array of cells is laid out in the following pattern:

| A | B | C |
| D | X | E |
| F | G | X | where cells A-G are active and cells X are inactive.

13. The apparatus of claim 12 wherein output signals from said array are logically combined as follows: A+F; B+G; A+C; D+E, respectively yielding quadrature signals XA, XB, YA and YB.

14. An optical position control system comprising,
a surface having an illuminated grid pattern thereon with two intersecting orthogonal sets of grid lines, said grid lines being of a first color and defining spaces therebetween of a second contrasting color, said grid lines characterized by a line width,
an optical mouse movable over said surface, said mouse having a three-by-three detector array of detector cells disposed for imaging areas of said illuminated grid pattern, at least some of said cells being grouped into pairs of cells, each of said pairs detecting motion of said mouse in a particular first direction relative to said surface, each of said cells generating an electrical signal corresponding to light reflected from said illuminated portion of said grid pattern, said cells arranged in the following pattern:

| A | B | C |
| D | X | E |
| F | G | X | where cells A-G are active and cells X are inactive and output signals from said cells are logically combined as follows: A+F, B+G, A+C and D+E yielding respective quadrature signals XA, XB, YA, YB.

* * * * *

UNITED STATES PATENT AND TRADEMARK OFFICE
CERTIFICATE OF CORRECTION

PATENT NO. : 4,751,380
DATED : June 14, 1988
INVENTOR(S) : Kenneth E. Victor et al.

It is certified that error appears in the above-identified patent and that said Letters Patent is hereby corrected as shown below:

Abstract, line 3, "grid pattern or" should read - -grid pattern of- -.

Column 2, lines 57-58, "voltage. BRIEF DESCRIPTION OF THE DRAWINGS". Heading BRIEF DESCRIPTION OF THE DRAWINGS should be on a new line.

Column 3, lines 16-17, "pattern. BEST MODE OF CARRYING OUT THE INVENTION". Heading BEST MODE OF CARRYING OUT THE INVENTION should be on a new line.

Column 6, line 13, "by onehalf" should read - -by one-half- -.

Claim 1, column 9, line 21, "said first part" should read - -said first pair- -.

Claim 2, column 9, line 33, "for comprising" should read - -for combining- -.

Signed and Sealed this

Second Day of June, 1992

*Attest:*

DOUGLAS B. COMER

*Attesting Officer*     *Acting Commissioner of Patents and Trademarks*